United States Patent [19]

Kruka et al.

[11] 4,281,402
[45] Jul. 28, 1981

[54] MARINE CABLE DECOUPLER

[75] Inventors: Vitold R. Kruka; Charles W. Ruth, both of Houston, Tex.

[73] Assignee: Shell Oil Company, Houston, Tex.

[21] Appl. No.: 54,220

[22] Filed: Jul. 2, 1979

[51] Int. Cl.³ .............................................. G01V 1/38
[52] U.S. Cl. ........................................ 367/15; 367/17; 114/253
[58] Field of Search ....................... 367/15, 17, 18, 20, 367/106, 130; 114/213–217, 247, 249, 253

[56] References Cited

U.S. PATENT DOCUMENTS

| 3,398,715 | 8/1968 | Burg ...................................... 114/253 |
| 3,570,441 | 3/1971 | Johnson et al. ........................ 114/253 |
| 3,576,170 | 4/1971 | Bush ...................................... 114/253 |
| 3,648,226 | 3/1972 | Fitzpatrick ............................ 114/253 |

Primary Examiner—Howard A. Birmiel

[57] ABSTRACT

A decoupling apparatus for isolating a towed marine streamer from noise transmitted from the tow vessel. The decoupling device comprises a fluid spring positioned in the tow cable with changes in the spring constant being minimized by controlling the fluid pressure.

13 Claims, 2 Drawing Figures

MARINE CABLE DECOUPLER

BACKGROUND OF THE INVENTION

The present invention relates to offshore seismic exploration and particularly to an apparatus for decoupling the seismic cable from the tow vessel. In an offshore seismic operation, a seismic cable having a length of one to three miles and containing a large number of hydrophones is towed behind a vessel to detect seismic signals. The detected seismic signals are the result of seismic waves produced by a seismic source being reflected or refracted from underground formations. Since the reflected signals are low level signals, the hydrophones must be sensitive and thus are also sensitive to any extraneous noise. The extraneous noise is in part due to the sea background noise, sea traffic, water flow past the cable and noise transmitted from the tow vessel. The present invention is directed primarily to eliminating the latter souce of noise.

As the tow vessel moves through the sea, it pitches, heaves and rolls due to the ocean swells and waves and this motion is transmitted to the tow cable that is connected to the seismic cable. At times the transmitted motion can have high acceleration as, for instance, when the tow cable slams against the tow vessel. In addition to the motions induced in the tow cable by the two vessel's motion, additional motion is produced by the vortex shedding that occurs as the cable is moved through the water. Vortex shedding causes the tow cable to oscillate or vibrate and occurs whenever the angle between the two cable and the water flow exceeds a critical angle.

BRIEF SUMMARY OF THE INVENTION

In present systems, the above problems are minimized by using stretch sections in the tow cable and relatively acceleration-insensitive hydrophones. A stretch section consists of nylon rope used as a tension member with the elastic properties of the nylon being used to deaden or filter out the motions of the tow vessel. While the nylon stretch section serves to decouple the seismic cable to some extent, it is not completely satisfactory. For example, the following data was collected using a 600-foot conventional stretch section, picking up the tow cable, allowing it to fall two feet and slam against the roller on the stern of the tow vessel. Also data was collected related to the magnitude of the noise produced by the tow cable vibrating at a 2 Hz with a wave length of 100 feet.

|  | Hydrophone Response in DB | |
|---|---|---|
|  | at 7.5 Hz | at 15 |
| Normal noise | 0 | 0 |
| Tow Cable Fall and Slam | +27 | +23 |
| Tow Cable Vibrating | +30 | +25 |

The above data illustrates that the acceleration insensitive hydrophones do respond to energy which is transmitted along the tow cable. The data also illustrates that the stretch section is too stiff or has too high a spring constant to adequately isolate or decouple the seismic cable from the tow vessel. The inadequacy of the stretch section can be adequately explained if one considers that the stretch of nylon rope depends primarily on the load applied. Since the load of the tow cable is continually applied to a certain degree, the dynamic spring constant of the nylon is considerably higher than the spring constant of an unloaded section of nylon.

The present invention solves the above problems by providing a decoupling apparatus which has a small or substantially zero spring constant. The apparatus comprises a fluid spring, for example, a pneumatic or pneumatic hydraulic or hydraulic cylinder for isolating the seismic cable from the tow cable. Preferably the decoupler is located just in front of the seismic cable so that the vibration induced by the vortex shedding of the tow cable is eliminated or isolated from the seismic cable. The fluid spring is supplied with pressurized fluid from the tow vessel at a substantially constant pressure. The constant pressure can be obtained by utilizing a surge tank supplied with pressurized fluid from a well regulated source and venting the surge tank at a pressure slightly above the supply pressure. Thus, as the fluid spring moves the pressure in the surge tank will remain within a very narrow range. In addition, the decoupler is supplied with swivel type connections for coupling to the seismic cable and the tow cable to avoid imparting a torque to the seismic cable. Also it is preferable that the decoupler be weighted in one plane so that it will orient itself in the water and not spin or rotate.

In addition, the decoupler is provided with a streamlined housing to minimize the noise produced by the waterflow around the decoupler. The housing preferably has a semi-spherical leading end which is attached to a tail piece which has a taper of more than four to one. Using this configuration, the noise imparted by the movement of the decoupler through the water is minimized. Further, the streamlined housing can be made free flooding. The larger mass provided by a water flooded housing will assist in damping transmittal of disturbances from the boat to the seismic cable while still being relatively light for deployment and pickup from the tow vessel.

BRIEF DESCRIPTION OF THE DRAWINGS

The invention will be more easily understood from the following detailed description of a preferred embodiment when taken in conjunction with the attached drawings in which.

DESCRIPTION OF THE PREFERRED EMBODIMENT

Figure 1:
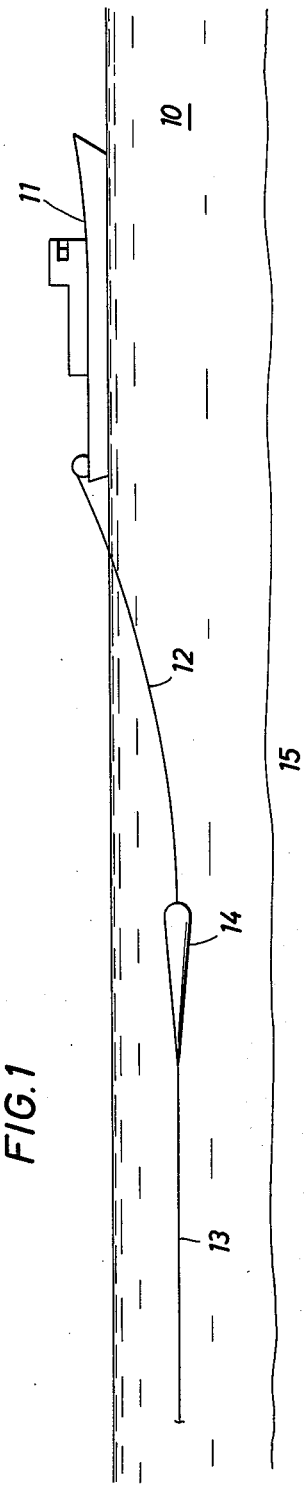
FIG. 1 is a view of the tow vessel and seismic cable utilizing the decoupler of the present invention.

Referring now to FIG. 1, there is shown a representative marine seismic exploration system. In particular, there is shown an exploration vessel 11 towing the seismic cable 13 astern at a controlled depth. The seismic energy generated by a source (not shown) is reflected from various interfaces in the formation and returns upwardly through the formation and water to be detected by the hydrophones in the seismic cable 13. The hydrophones in the cable convert the detected seismic energy to electrical signals which are transmitted over the cable to the vessel 11 where they are recorded. The seismic cable 13 has a length of from one to three miles and is towed at a controlled depth by suitable controllable floats placed on the cable. As the vessel 11 tows the seismic cable through the water, the vessel will be subject to various wave and wind actions which will cause it to pitch and yaw and thus induce considerable motion in the tow cable 12. It is desirable to isolate the seismic cable 13 from these random motions to reduce the amount of randomly induced noise in the seismic signals. As explained above, this is normally accomplished by including a stretch section formed of nylon rope in the tow cable 12. While nylon rope has some stretch and serves to dampen the motion induced by the vessel 11, it is not a satisfactory coupling means since it is normally under considerable stress as a result of the drag of the seismic cable. Thus, its spring constant is very high which reduces its ability to dampen out or decouple the motion of the vessel 11 from the seismic cable 13. As a result, in ordinary marine explorations, considerable random noise is induced in the seismic signals as a result of the motion of the boat. This is true even when acceleration-insensitive hydrophones are used since it is impossible to eliminate all of the effects of the tow vessel on the hydrophones.

Figure 2:
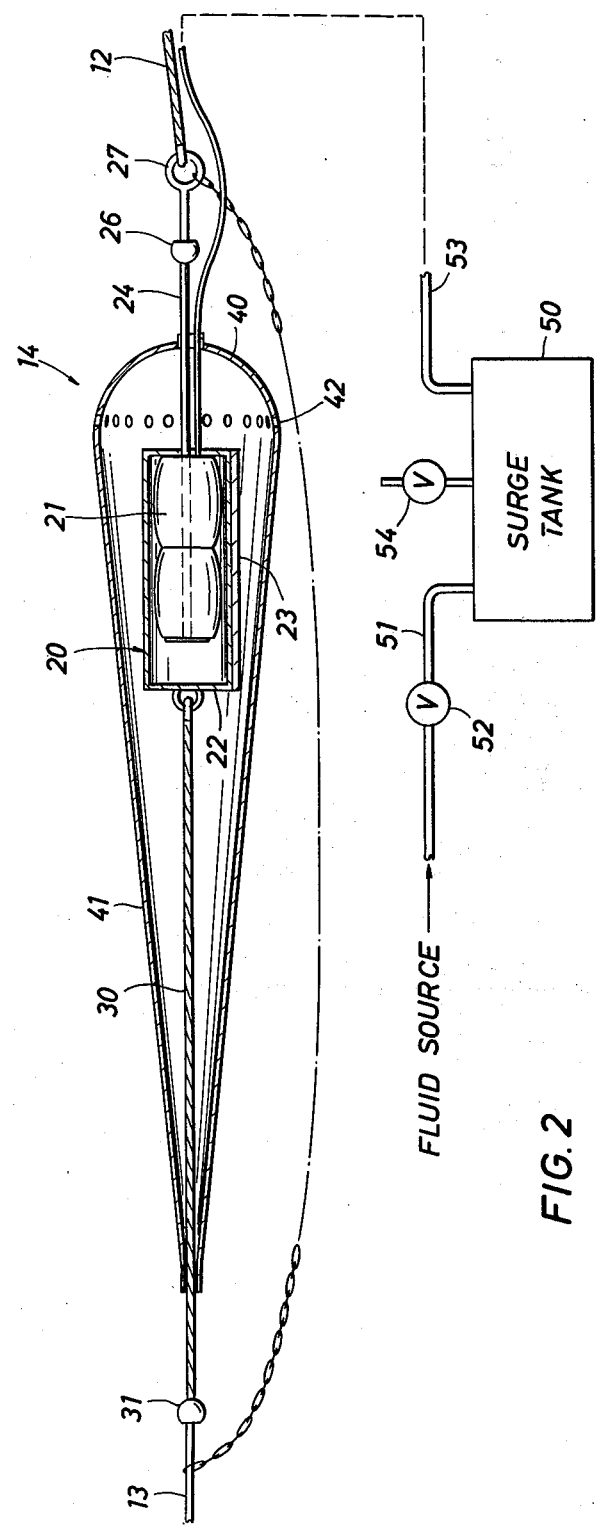
FIG. 2 is a vertical section of a decoupler constructed in accordance with this invention and showing the means for maintaining a substantially constant fluid pressure in the decoupler.

Referring now to FIG. 2, there is shown a cross section of the decoupling means 14 of the present invention shown in FIG. 1, including the constant pressure source. The decoupler utilizes a fluid spring 20 which is mounted within a streamlined housing 40. As shown, the fluid spring comprises a pair of air springs 21 and while air springs are shown, other types of fluid springs (for example, hydraulic cylinders) can also be used. The fluid spring is disposed so that the tow cable is coupled to the rod 24 attached to the springs while the seismic cable can be coupled to the rod 30 which extends from the outer housing of the fluid spring. It is preferable that the fluid spring be ballasted as by a suitable weight 23 so that the spring will maintain a constant orientation and not tend to rotate due to water-flow around the housing. This will minimize the torque loads transmitted from the towing cable 12 to the seismic cable 13. Ball or swivel joints 31 and 26 are provided at the ends of the decoupler in order that the decoupler may be free to orient itself with respect to the tow cable 12 and the seismic cable 13. The swivel joints also reduce the torque loads transmitted from the tow cable to the decoupler.

The decoupler should be provided with a streamlined shape to reduce the amount of noise created by movement of the decoupler through the water. The streamlined shape can be provided by a nose section 40 having a semi-spherical shape and a tail section 41 having a conical shape. The tail section should have a length to diameter ratio of at least 4 to 1. In addition, a series of small vent holes or ports 42 should be provided to enable the decoupler to be flooded, thus increasing its mass. The increased mass will assist in damping motion between the tow vessel and the seismic cable.

The fluid spring is supplied with a source of constant pressure fluid, for example, compressed air from a source on the tow vessel. The pressure of the source is regulated by a pressure control valve 52 and supplied by a line 51 to a surge tank 50. The surge tank is coupled by means of flexible hose 53 to the air cylinder 21. In addition, the surge tank is provided with a pressure relief or vent valve 54 to maintain a relatively constant pressure in the tank. The vent valve should be set at a slightly higher pressure than the pressure regulating valve 52 to limit the amount of compressed air which is vented to the atmosphere. With this arrangement, the air cylinder will have a substantially zero or minimum spring constant which will not change as the tow vessel's movement creates surges in the tow cable, or the load on the tow cable 12 varies.

In addition to the above fluid spring, obviously other variations are possible, for example, hydraulic cylinders. Also, it would be desirable to provide a safety link, for example, chain 60 between the towing eye 27 on the decoupler and a similar eye positioned in the marine cable so that the seismic cable is not lost if the decoupler fails. Also, necessary electrical leads will have to be provided between the towing vessel and the seismic cable and these connections would have to be incorporated into the towing cable. These items are well within the skill of the art.

We claim:

1. A decoupling apparatus for substantially isolating a towed seismic cable from noise transmitted along the tow cable from the towing vessel, said decoupling apparatus comprising:

a fluid spring means, said spring means being disposed in said tow cable between said tow vessel and said seismic cable;

means coupled to spring means for minimizing the spring constant of the spring means; and said spring means being coupled between one end of said seismic cable and one end of said tow cable whereby said seismic cable is isolated from the tow cable.

2. The apparatus of claim 1 wherein said spring means is an air spring.

3. The apparatus of claim 1 wherein said spring means is a hydraulic cylinder.

4. The apparatus of claim 1, 2 or 3 wherein the means for minimizing the spring constant comprises means for maintaining a relative constant fluid pressure in said spring.

5. The apparatus of claim 1 wherein the means for minimizing the spring constant comprises a surge tank.

6. The apparatus of claim 5 and in addition means for maintaining a substantially constant pressure in said surge tank.

7. The apparatus of claims 1, 2 or 3 and in addition a housing, said housing surrounding said spring means and shaped to reduce the noise produced by the flow of water past said decoupler.

8. The apparatus of claim 1, 2 or 3 and in addition, a streamlined housing, said housing being adapted to surround said spring means, said housing having a hemispherial shaped front and a cone shaped rear, said cone shaped rear having a length to diameter greater than four.

9. The apparatus of claim 8 wherein the streamlined housing is free-flooding through small ports in the housing.

10. The apparatus of claim 1 wherein said spring means is attached to said tow cable by swivel means that permit the spring means to rotate.

11. The apparatus of claim 9 and in addition gravity responsive means for maintaining the orientation of said spring means.

12. The apparatus of claim 10 wherein said gravity responsive means comprises a ballast member attached to said spring means.

13. The apparatus of claim 6 wherein said means for maintaining a substantially constant pressure in the surge tank comprises a source of pressurized fluid coupled to said surge tank, pressure control means disposed to maintain the pressurized fluid supplied to said surge tank substantially at a preset value and vent means disposed on said surge tank to vent said surge tank when the pressure in the surge tank exceeds the preset value.

* * * * *